No. 732,708. Patented July 7, 1903.

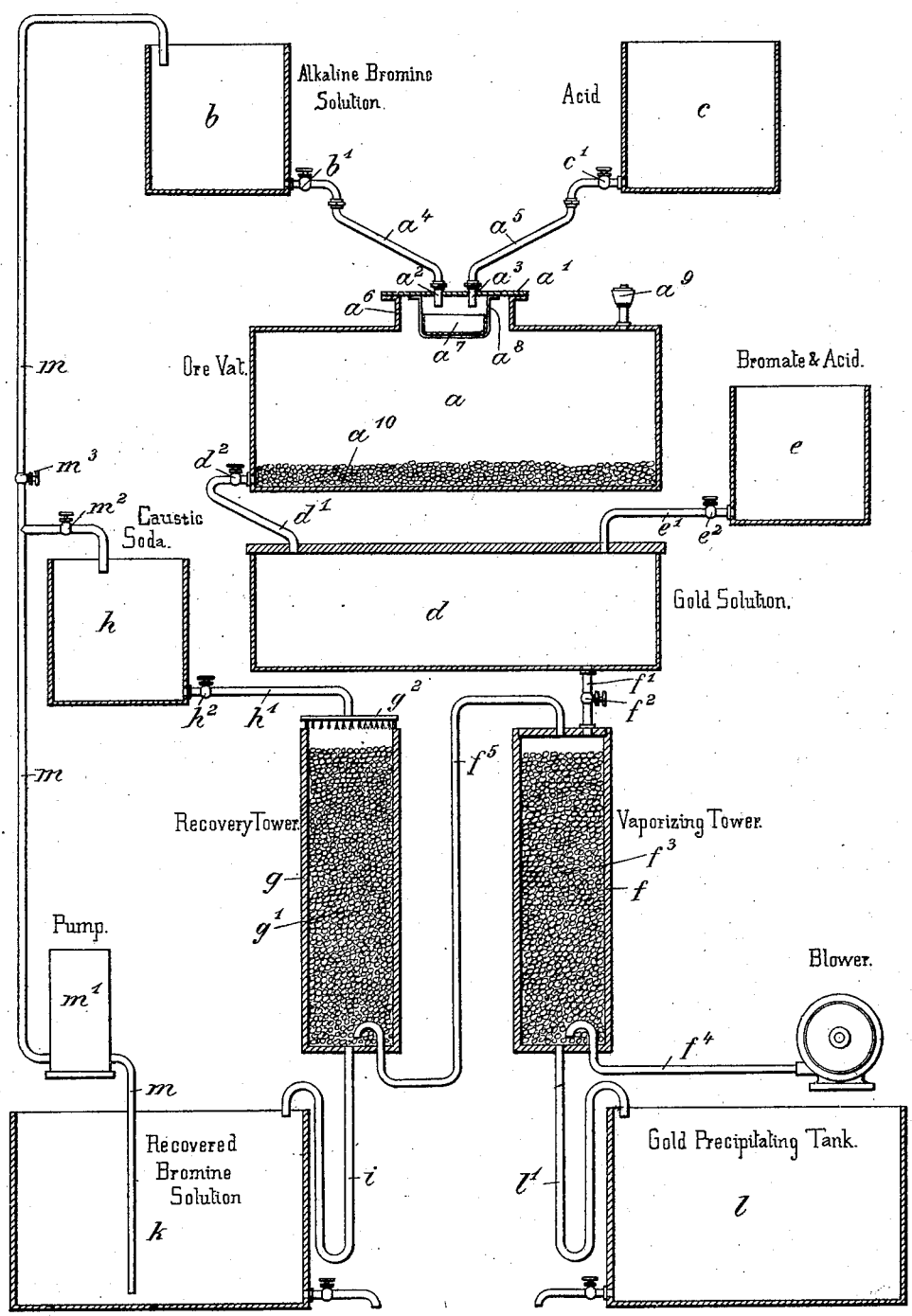

UNITED STATES PATENT OFFICE.

HENRY R. CASSEL, OF NEW YORK, N. Y.

PROCESS OF EXTRACTING GOLD FROM ORES.

SPECIFICATION forming part of Letters Patent No. 732,708, dated July 7, 1903.

Application filed October 22, 1902. Serial No. 128,255. (No specimens.)

*To all whom it may concern:*

Be it known that I, HENRY R. CASSEL, a citizen of the United States, residing at New York city, (Manhattan,) county and State of New York, have invented certain new and useful Improvements in Processes of Extracting Gold from Ores, of which the following is a specification.

This invention relates to an improved process for extracting gold from ores in an economical and effective manner.

Briefly stated, the invention consists in first setting bromin free from an alkaline bromin solution, then subjecting the ore to the action of the liberated bromin to dissolve the gold, and then subjecting the gold solution to a mixture of a bromate and an acid, whereby all the bromin is liberated. The bromin is then separated and mixed with soda or an equivalent base, so as to again obtain an alkaline bromin solution ready when mixed with an acid to act upon a fresh body of ore.

The accompanying drawing represents a side elevation, partly in section, of an apparatus for carrying my invention into effect.

The letter $a$ represents a vat or vessel for containing ore and having a manhole provided with a cover $a'$, that renders the vat vapor-tight. Into vat $a$ pass metal pipes $a^2$ and $a^3$, leading, respectively, by flexible hose connections $a^4$ $a^5$ to an alkaline-bromin-solution tank $b$ and an acid-tank $c$. The pipes $a^2$ $a^3$ are controlled by cocks $p'$ $c'$ and terminate above an overflow or distributing pan or mixer $a^7$, arranged in the neck $a^6$ of vat $a$, the pan being suspended from cover $a'$ by fastenings $a^8$. The vat $a$ is furthermore provided with a vent $a^9$ and a filter $a^{10}$. This filter is by pipe $d'$, having cock $d^2$, connected to a closed gold-solution tank $d$. The tank $d$ is further connected by pipe $e'$, having cock $e^2$, to a bromate and acid tank $e$ and by pipe $f'$, having cock $f^2$, to the top of a closed vaporizing or scrubbing tower $f$. The tower $f$ is filled with pebbles $f^3$, adapted to subdivide the charge, while an air-blast may be introduced into the bottom of the tower through blast-pipe $f^4$. From the bottom of tower $f$ a bent pipe $l'$ leads to the gold-precipitating tank $l$, while from the top of tower $f$ a pipe $f^5$ leads to the bottom of a bromin-recovery tower $g$. The tower $g$ is filled with pebbles $g'$, similar to tower $f$; but its top is open and provided with a perforated pan or spiral $g^2$. Into this pan a solution of sodium hydroxid is led from tank $h$ by pipe $h'$, having cock $h^2$. At the bottom the tower $g$ is connected by bent pipe $i$ to a recovered-bromin-solution tank $k$. From this tank a pipe $m$, coupled to a pump or lifter $m'$, leads to tank $b$ to form a cycle. The pipe $m$ has a faucet $m^2$, emptying into tank $h$, and a cock $m^3$ above said faucet.

In carrying out the process by means of the above apparatus I proceed as follows: The vat $a$ being charged with ore and tightly closed, I form in tank $b$ a leaching solution by mixing bromin with sodium hydroxid.

$$2NaOH + 2Br = NaBrO + NaBr + H_2O.$$

This solution is run into pan $a^7$ simultaneously with a charge of sulfuric acid from tank $c$, by means of which the bromin is set free within the pan.

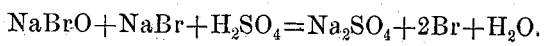
$$NaBrO + NaBr + H_2SO_4 = Na_2SO_4 + 2Br + H_2O.$$

The free acid-bromin solution runs over pan $a^7$, gradually leaches through the ore, and passes through the filter $a^{10}$ into the closed tank $d$. The bromin during its passage through the ore dissolves the gold and combines also with the bases generally present—such as lime, magnesia, alumina, &c.—forming bromids. The solution in tank $d$ will thus contain dissolved gold, free bromin, bromids, and any excess of acid. To recover all the bromin, it is necessary to decompose the bromids, and this is effected by a mixture of a bromate of sodium or other suitable bromate with sulfuric acid prepared in tank $e$. The bromate of sodium and the sulfuric acid alone do not react upon each other in dilute solutions within tank $e$; but in the presence of bromids all the bromin of the bromids, as well as that contained in the bromate, is set free. Thus by running the mixture from tank $e$ into vat $d$ the bromate solution immediately begins to react, and all the bromin is liberated with the exception of that combined with the gold.

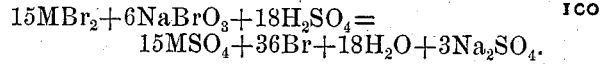
$$15MBr_2 + 6NaBrO_3 + 18H_2SO_4 = \\ 15MSO_4 + 36Br + 18H_2O + 3Na_2SO_4.$$

When all the bromin has been set free in the manner described, the solution from tank $d$ is allowed to run through pipe $f'$ into the tower $f$, within which it is subdivided by means of the pebbles. A jet of air introduced at the bottom of tower $f$ through pipe $f^4$ will now vaporize the bromin in the descending subdivided solution, the bromin-vapors being driven by the air-blast through the pipe $f^5$ into the bottom of the recovery-tower $g$. A solution of an alkaline hydroxid, such as sodium hydroxid, is led from tank $h$ through pipe $h'$ into the pan $g^2$ to combine with the ascending bromin-vapors and form an alkaline bromin solution, which I term the "recovered-bromin solution." This solution is run into tank $k$ and is thence pumped through pipe $m$ into the tank $b$ for treating a new batch of ore after being mixed with acid from tank $c$. If desired, the solution from tower $g$ may be run once more through tank $h$ by closing cock $m^3$ and opening faucet $m^2$. The gold solution from the vaporizing-tower $f$, deprived of its free bromin, runs into tank $l$, where the gold is precipitated by hydrogen sulfid or in other manner.

The bromate and acid solution may be introduced into vat or vessel $a$ instead of vat $d$; but in that case the solution from vat $d$ is pumped into tank $a$ to secure a thorough mixture and perfect decomposition of the bromids. If the vessel $a$ is made in the form of a rotating barrel, I first introduce the mixture of bromate and sufficient acid to decompose the bromates and bromids. The ore is then charged, and finally the alkaline bromin solution is added.

What I claim is—

1. A step in the process of extracting gold from ore which consists in treating the ore with a bromin solution to form dissolved gold and bromids, mixing bromate with an acid, and causing said mixture to act upon the dissolved gold and bromids so as to set free the bromin of the bromids and bromate, substantially as specified.

2. A step in the process of extracting gold from ore, which consists in mixing an alkaline bromin solution with an acid, to form free bromin in solution, leaching the ore therewith, adding a mixture of a bromate and an acid to decompose the bromids formed and to set free the bromin of the bromids and bromate, substantially as specified.

3. A step in the process of extracting gold from ore, which consists in adding a mixture of a bromate and an acid to a solution containing dissolved gold and bromids of the bases of the ore, subdividing the solution, and subjecting the subdivided solution to an air-blast, to vaporize the bromin and separate the bromin-vapors from the gold solution, substantially as specified.

4. A step in the process of extracting gold from ore, which consists in adding a mixture of a bromate and an acid to a solution containing dissolved gold and bromids of the bases of the ore, subdividing the solution, vaporizing and separating the bromin, and combining the separated bromin-vapors with an alkaline hydroxid to form hypobromite and bromid, substantially as specified.

5. The process of extracting gold from ore, which consists in mixing an alkaline bromin solution with an acid to form free bromin in solution, leaching the ore therewith, adding a mixture of a bromate and an acid to decompose the bromids formed and set free the bromin of the bromids and bromate, subdividing the solution, vaporizing the bromin, precipitating the gold, combining the bromin-vapors with an alkaline hydroxid to form hypobromite and bromid in solution, mixing said solution with an acid, and treating a fresh body of ore with said mixture, substantially as specified.

Signed by me at New York city, (Manhattan) New York, this 21st day of October, 1902.

HENRY R. CASSEL.

Witnesses:
WILLIAM SCHULZ,
F. V. BRIESEN.